United States Patent [19]

Critchlow

[11] Patent Number: 5,024,266
[45] Date of Patent: Jun. 18, 1991

[54] HEATED ROLL

[75] Inventor: Graham Critchlow, Cheadle Hulme, England

[73] Assignee: Simon Container Machinery Limited, Stockport, England

[21] Appl. No.: 552,076

[22] Filed: Jul. 13, 1990

[51] Int. Cl.⁵ .................... F28D 11/02; F26B 11/04
[52] U.S. Cl. ........................... 165/89; 34/124; 34/125; 137/313
[58] Field of Search ............. 165/89; 34/124, 125; 137/313, 580

[56] References Cited

U.S. PATENT DOCUMENTS

| | | | |
|---|---|---|---|
| 1,135,720 | 4/1915 | Roach | 34/124 |
| 1,953,525 | 4/1934 | Young | 34/125 |
| 2,437,004 | 3/1948 | Rutledge | 34/124 |
| 2,599,346 | 6/1952 | Offen | 165/89 |
| 2,875,527 | 3/1959 | Daane | 34/124 |
| 2,978,815 | 4/1961 | Hieronymus | 34/125 |
| 3,473,237 | 10/1969 | McCourt | 165/89 |
| 3,948,283 | 4/1976 | Asfura et al. | 34/125 |
| 4,498,249 | 2/1985 | Cooke et al. | 34/125 |
| 4,590,688 | 5/1986 | Steffero, Sr. | 34/124 |
| 4,691,452 | 9/1987 | Ferguson | 34/125 |

Primary Examiner—John Rivell
Assistant Examiner—L. R. Leo
Attorney, Agent, or Firm—Nies, Kurz, Bergert & Tamburro

[57] ABSTRACT

A heated roll comprising a hollow cylindrical shell (10) with a syphon pipe (14) passing into the roll from a rotary joint (13) mounted on an end thereof. A non-rotating part of the rotary joint is mounted with a clearance fit on a pair of fixed parallel guide bars (22). Jacking screws (27) threadingly engaged within a cross bar (26) attached to the non-rotating part of the rotary joint, bearing upon each guide bar thus to enable the longitudinal axes of the rotary joint (13) and the roll shell (10) to be relatively adjustable thus to determine and set an accurate position for the inner open end of the syphon pipe (12) close to the inner wall of the shell (10).

4 Claims, 2 Drawing Sheets

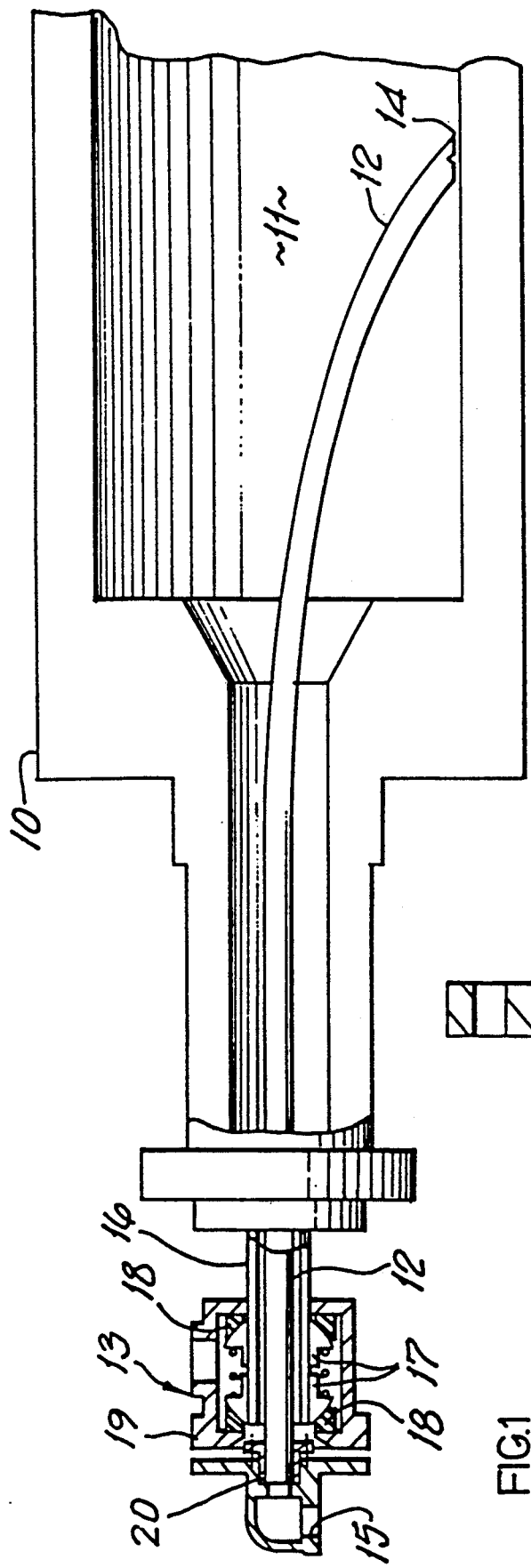
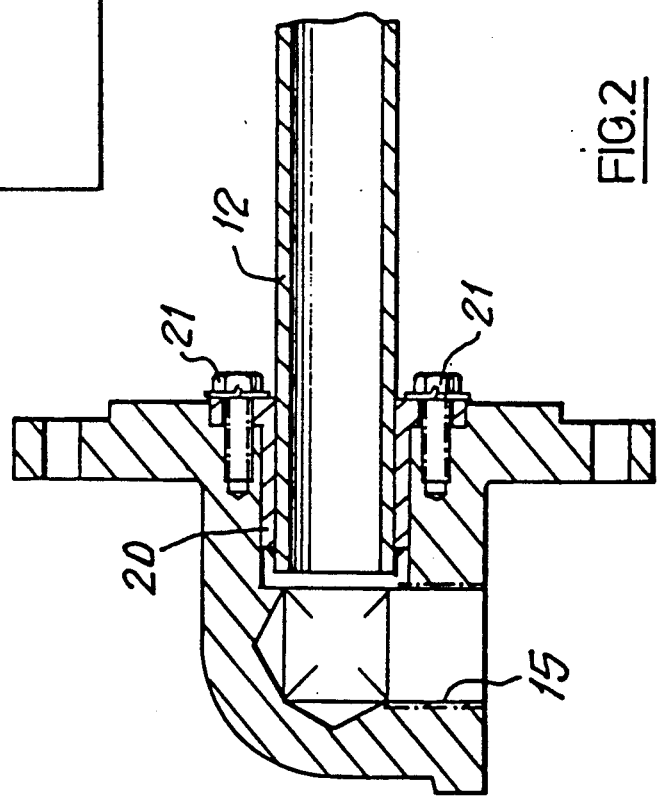

HEATED ROLL

This invention concerns a heated roll of the type comprising a hollow cylindrical shell defining an internal chamber into which steam may be fed through a rotary joint and from which, during operation, condensate is withdrawn through a syphon pipe to a position outside the roll.

In such apparatus it is usual for the syphon pipe to pass through a rotary seal at the end of the roll coaxial therewith and for its inner end to be curved downwardly towards the lowermost position within the internal chamber. The innermost open end of the pipe is located approximately 2 mm or less from the internal wall of the chamber at that location, and it is essential for efficient operation that the gap is maintained. In practice, as a result of wear in the bearings and seal after a period of use, the inner open end of the pipe tends to rise thus widening the gap so that the volume of condensate remaining in the roll tends to increase to a level at which uniform and optimum heating of the roll cannot be guaranteed.

It is an object of the present invention to provide means whereby the height of the inner open end of the syphon pipe above the internal chamber wall is adjustable such that the required gap can be maintained.

According to the present invention, there is provided, a heated roll comprising a hollow cylindrical shell defining an internal chamber into which steam may be fed, a syphon pipe fixed within said chamber and having one open end near to the lowermost position therein, the pipe having a part of its length concentric with the roll and located within a rotary sealed joint at its other open end outside the chamber for drainage of condensate therefrom, characterised in that the pipe is fixed to a non-rotating part of the rotary joint by means to ensure that said one open end remains located near to said lowermost position, and in that means are provided for adjusting the attitude of the longitudinal axis of the pipe relative to that of the roll.

Preferably, the means for fixing the pipe to the non-rotating part of said rotary joint comprises at least one member fixed rigidly to the pipe wall and extending radially therefrom to receive a fixing bolt for the pipe thus to determine the position of said pipe about its longitudinal axis.

As a further preference said adjustment means for the relative longitudinal axes of said pipe and said roll comprises a plurality of jacking screws operable to adjust the position of said rotary joint and thus of said pipe attached thereto, relative to the rotational axis of the roll.

An embodiment of the invention will now be described, by way of example only, with reference to the acompanying schematic drawings in which:

FIG. 1 is a part-sectional elevation of a heated roll incorporating the invention;

FIG. 2 is an enlarged view of part of the assembly illustrated in FIG. 1;

Figure 3:
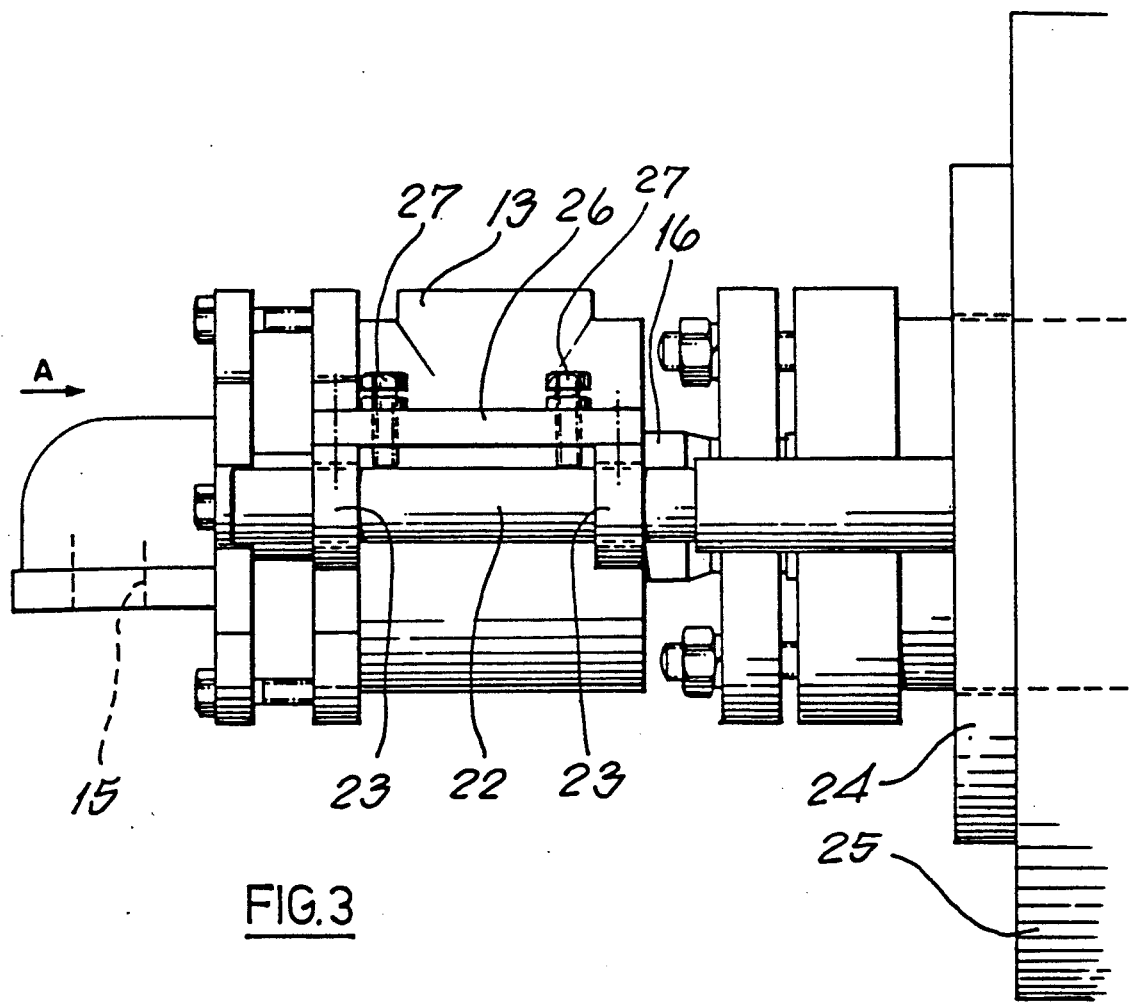
FIG. 3 is an elevational external view of a rotary jont for the heated roll.
Figure 4:
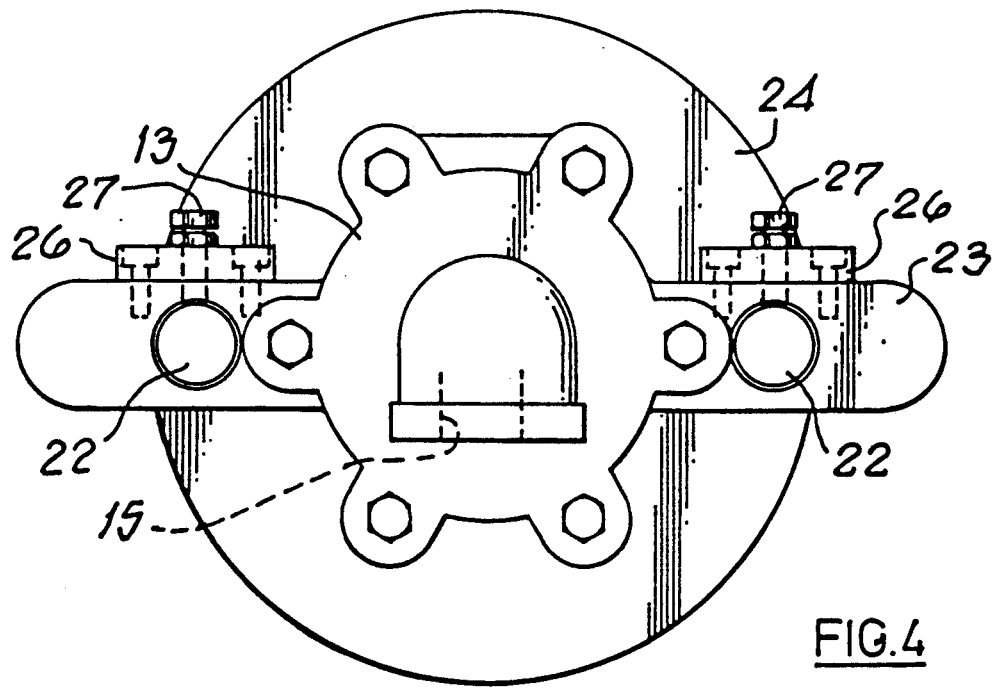

and FIG. 4 is a view taken in the direction of Arrow A in FIG. 3.

Referring now to the drawings, there will be seen a cylindrical shell 10 which is rotatably mounted in bearings (not shown) and defining an internal chamber (11).

Conventional means will be provided to supply steam at superatmospheric pressure to the chamber 11 to heat the shell 10 during rotation.

A syphon pipe 12 passes through the end of the roll and is fixed within a rotary sealed joint generally inicated at 13. In its innermost end region, pipe 12 is curved downwardly to its inner open end 14 which is positioned at a distance 2 mm or less from the internal wall of the shell 10 at its lowermost position. Condensate collecting in the bottom of the roll during operation is caused, due to the pressure of the steam within the chamber, to flow outwardly through pipe 12 to a port 15 in the rotary sealed joint 13, for drainage. Conveniently, a pipe is connected to port 15 so that the condensate may be led away for disposal, or recirculation within the heating system.

The rotating shell 10 is connected to a rotary part 16 of the joint 13, on which are mounted a pair of spring-loaded rotary seals 17 which bear against fixed carbon seals 18 mounted in the fixed casing 19 of the joint.

Passing concentrically through the rotary part 16 is the stationary pipe 12, and this is fixed to the stationary part 19 of the joint by means of a flanged bush 20 which is preferably welded to the end region of the pipe.

As can be seen from FIG. 2 the angular or rotary position of the pipe 12 is determined by a pair of wired fixing bolts 21 which pass through the flange of bush 20 and are located within the fixed casing 19. Conventionally, the outer end of pipe 12 has been attached to the casing by means of a tapered thread between the casing and the pipe, but the position of the end 14 of the pipe relative to the internal wall of the chamber 11, in such an arrangement, was determined by the extent and start position of the thread so that a considerable amount of skill was needed to ensure that the pipe 12 is properly positioned and remains in place. However, with the arrangement as described and illustrated herein the position of the pipe is not left to chance.

Again conventionally, as the bearings of the roll and/or the interacting faces of the rotary and stationary seals within the rotary joint, begin to wear, the inner open end 14 of the pipe 12 has tended to rise or fall relative to the wall of the chamber 11 thus changing the volume of condensate permitted to remain therein.

Referring now to FIGS. 3 and 4, the rotary joint 13 is attached by guide bars 22 passing through lugs 23, one pair on each side of the casing 19, to a fixed disc 24 positioned about the axis of rotation of the roll. The guide bars are rigidly fixed to disc 24 which is attached to a bearing housing 25. Fixed to each pair of lugs 23 is a cross bar 26 in which are threaded a pair of spaced jacking screws 27 which bear on the associated guide bar 22. There is a clearance fit of guide bars 22 within lugs 23.

Thus it will be seen that by manipulating jacking screws 27, the angular relationship (as viewed in FIG. 3) between joint 13 (in which the pipe 12 is carried) and fixed guide bars 22, may be adjusted slightly thus permitting the inner open end 14 of syphon pipe 12 to be raised and lowered relative to the internal wall of chamber 11.

In practice, the jacking screws 27 are adjusted until the end 14 of the pipe just touches the internal wall, which position can be detected audibly by rotating the roll, and then the screws are backed-off by an amount with which an operator will be familiar in order to create the required gap. Furthermore, should the operator require a greater or lesser gap this can be further adjusted as required.

Adjustment of the gap by means of jacking screws 27 may be repeated at regular intervals to ensure maintenance of the required gap within the roll so that the condensate level therein can be determined and maintained.

I claim:

1. A heated roll comprising a hollow cylindrical shell defining an internal chamber into which steam may be fed, a syphon pipe fixed within said chamber and having one open end near to the lowermost position therein, the pipe having a part of its length substantially concentric with the roll and located within a rotary sealed joint outside of the chamber for drainage of condensate therefrom, said pipe being fixed to a non-rotating part of the rotary joint; characterized in that said non-rotating part is mounted with a clearance fit on a pair of fixed guide bars; and in that a plurality of jacking screws are operable between said non-rotating part and said guide bars to adjust the position of the non-rotating part and thus the pipe relative to the rotational axis of the roll.

2. A heated roll according to claim 1, wherein the pipe is fixed to the non-rotating part of the rotary joint by at least one member fixed rigidly to the pipe wall and extending radially therefrom to receive a fixing bolt thus to determine the angular position of the pipe about its longitudinal axis.

3. A heated roll according to claim 1, wherein said jacking screws are threadedly engaged within a part of said non-rotating part thus to bear directly upon said fixed guide bars at spaced positions therealong.

4. A heated roll according to claim 3, including on each of two opposed sides of said non-rotating part of pair of apertured lugs through which an associated one of said guide bars passes with said clearance fit, there being a cross bar attached to and extending between the lugs of each pair and having threadedly engaged therein a pair of said jacking screws at spaced positions along the cross bar and passing through same to bear upon the associated guide bar.

* * * * *